United States Patent
Birk et al.

(10) Patent No.: US 9,450,822 B2
(45) Date of Patent: *Sep. 20, 2016

(54) DYNAMIC EXTENSIBLE APPLICATION SERVER MANAGEMENT

(71) Applicant: International Business Machines Corporation, Armonk, NY (US)

(72) Inventors: Peter D. Birk, Austin, TX (US); Gordan G. Greenlee, Endicott, NY (US); Richard J. McCarty, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,604

(22) Filed: Nov. 21, 2014

(65) Prior Publication Data
US 2015/0244579 A1    Aug. 27, 2015

Related U.S. Application Data

(63) Continuation of application No. 14/190,485, filed on Feb. 26, 2014.

(51) Int. Cl.
*H04L 12/24* (2006.01)
*H04L 29/08* (2006.01)
(Continued)

(52) U.S. Cl.
CPC ......... *H04L 41/0816* (2013.01); *G06F 3/0484* (2013.01); *H04L 41/0809* (2013.01);
(Continued)

(58) Field of Classification Search
CPC ... H04L 41/22; H04L 67/10; H04L 63/1466; H04L 63/1425; H04L 41/0816; H04L 63/168; H04L 63/1416; H04L 41/0809; G06F 3/0484
See application file for complete search history.

(56) References Cited

U.S. PATENT DOCUMENTS 6,879,995 B1 * 4/2005 Chinta .................... H04L 67/24
                                                          709/204
7,350,226 B2 * 3/2008 Moriconi et al. ................. 726/1
(Continued)

FOREIGN PATENT DOCUMENTS

WO          02101973 A1    12/2002

OTHER PUBLICATIONS

Microsoft Press, Microsoft Computer Dictionary 5th Edition, Microsoft, 2002, p. 409.*

(Continued)

*Primary Examiner* — Joseph P Hirl
*Assistant Examiner* — Stephen Gundry
(74) *Attorney, Agent, or Firm* — Lee Law, PLLC; Christopher B. Lee

(57) ABSTRACT

An administrative control interface is provided that controls deployed application server plugins that operate within an application-server plugin framework deployed at a group of application servers. The administrative control interface controls dynamic adjustment of runtime application server plugin configurations that perform request-level management and server-level management of the group of application servers. Request-level application server functionality and server-level application server functionality of at least one of the group of application servers is controlled using at least one of the deployed application server plugins as specified by application-server plugin commands received from the administrative control interface.

7 Claims, 10 Drawing Sheets

(51) Int. Cl.
   *G06F 3/0484* (2013.01)
   *H04L 29/06* (2006.01)
(52) U.S. Cl.
   CPC ........... *H04L41/22* (2013.01); *H04L 63/1416* (2013.01); *H04L 63/1425* (2013.01); *H04L 63/1466* (2013.01); *H04L 63/168* (2013.01); *H04L 67/10* (2013.01)

(56) References Cited

U.S. PATENT DOCUMENTS

| | | | | |
|---|---|---|---|---|
| 7,383,534 | B1 * | 6/2008 | Agbabian | G06F 8/71 717/108 |
| 7,472,422 | B1 * | 12/2008 | Agbabian | H04L 41/06 726/25 |
| 7,603,547 | B2 | 10/2009 | Patrick et al. | |
| 8,635,618 | B2 * | 1/2014 | Aggarwal | G06F 9/4843 707/609 |
| 8,943,575 | B2 * | 1/2015 | Kumar | H04L 63/0227 713/182 |
| 8,990,893 | B2 | 3/2015 | Greenlee et al. | |
| 9,100,421 | B2 | 8/2015 | Greenlee et al. | |
| 2002/0173997 | A1 * | 11/2002 | Menard et al. | 705/7 |
| 2002/0188869 | A1 | 12/2002 | Patrick | |
| 2005/0033794 | A1 * | 2/2005 | Aridor | H04L 29/06 709/200 |
| 2005/0044418 | A1 * | 2/2005 | Miliefsky | H04L 63/1433 726/4 |
| 2005/0081055 | A1 * | 4/2005 | Patrick et al. | 713/200 |
| 2005/0154886 | A1 * | 7/2005 | Birk | H04L 63/105 713/168 |
| 2006/0195899 | A1 * | 8/2006 | Ben-Shachar et al. | 726/12 |
| 2006/0242626 | A1 * | 10/2006 | Pham | G06F 9/44505 717/121 |
| 2007/0192867 | A1 * | 8/2007 | Miliefsky | G06F 21/577 726/25 |
| 2007/0208832 | A1 * | 9/2007 | Traub et al. | 709/220 |
| 2008/0004887 | A1 * | 1/2008 | Brunswig | G06F 9/5027 719/320 |
| 2008/0127076 | A1 * | 5/2008 | McArdle | G06F 9/44536 717/120 |
| 2008/0222697 | A1 * | 9/2008 | Birk | G06F 21/31 726/1 |
| 2008/0235771 | A1 * | 9/2008 | Corley | G06F 21/53 726/4 |
| 2008/0301629 | A1 * | 12/2008 | Stark | G06F 8/24 717/107 |
| 2008/0307506 | A1 * | 12/2008 | Saldhana | 726/4 |
| 2009/0177646 | A1 * | 7/2009 | Pham | G06F 17/30386 |
| 2010/0125477 | A1 * | 5/2010 | Mousseau | G06F 9/5072 717/177 |
| 2012/0216133 | A1 * | 8/2012 | Barker et al. | 715/760 |
| 2012/0254947 | A1 * | 10/2012 | Dheap | H04L 63/20 726/4 |
| 2013/0263088 | A1 * | 10/2013 | Hoff | G06F 9/45529 717/121 |
| 2014/0282471 | A1 * | 9/2014 | Chaney | G06F 8/65 717/170 |

OTHER PUBLICATIONS

Gama et al., Application management plug-ins through dynamically pluggable probes, ACM, Proceedings of the 1st Workshop on Developing Tools as Plug-ins, 2011, p. 32-35.*

Holger Wunderlich, et al., z/Os WebSphere and J2EE Security Handbook, Redbooks, Jul. 2003, Second Edition, International Business Machines Corporation, Published online at ibm.com/redbooks/SG24684601.

United States Patent and Trademark Office, Office Action for U.S. Appl. No. 14/190,485, Jun. 5, 2015, pp. 1-22, Alexandria, VA, USA.

United States Patent and Trademark Office, Office Action for U.S. Appl. No. 14/190,485, Dec. 18, 2015, pp. 1-26, Alexandria, VA, USA.

Stephen T. Gundry, Examiner, United States Patent and Trademark Office, Notice of Allowance for Application No.: 14/190,485, Jun. 7, 2016, pp. 1-19, Alexandria, Va, USA.

Stephen T. Gundry, Examiner, United States Patent and Trademark Office, Miscellaneous Communication and PTO-892 Form for U.S. Appl. No. 14/190,485, Jun. 27, 2016, pp. 1-3, Alexandria, VA, USA.

* cited by examiner

500

[DATE TIME] 0000004C CIOREQUESTPLU CALLING UPDATE WITH THE FOLLOWING PLUGINMETADATA; USERAUDITREQUESTPLUGIN, VERSION: 1

[DATE TIME] 0000004C CIOREQUESTPLU UPDATING PLUGIN: USERAUDITREQUESTPLUGIN, VERSION: 1, WITH COMMAND: REVOKE: JOEUSER@NOMAIL.RELAY.COMPANY.COM

[DATE TIME] 0000004C USERAUDITREQU REVOKING USER: JOEUSER@NOMAIL.RELAY.COMPANY.COM

[DATE TIME] 000001D0 CIOREQUESTPLU CALLING UPDATE WITH THE FOLLOWING PLUGINMETADATA; IPADDRESSAUDITREQUESTPLUGIN, VERSION: 1

[DATE TIME] 000001D0 CIOREQUESTPLU UPDATING PLUGIN: IPADDRESSAUDITREQUESTPLUGIN, VERSION: 1, WITH COMMAND: REVOKE: 172.A.B.C

[DATE TIME] 000001D0 IPADDRESSAUDI REVOKING IP ADDRESS: 172.A.B.C

702 [DATE TIME] 00000041 CIOREQUESTPLU CIO CALLING PREINVOKE() ON PLUGIN: USERAUDITREQUESTPLUGIN, VERSION: 1

704 [DATE TIME] 00000041 USERAUDITREQU * USER REVOKE ALERT *
REQUEST.DATA.USER.ID: JOEUSER@NOMAIL.RELAY.COMPANY.COM
REQUEST.DATA.USER.UNIQUEID: UID=JOEUSER, C=US, OU=DIRECTORYPAGES, O=COMPANY.COM

706 [DATE TIME] 00000041 WEBAPP E COM.COMPANY.WS.WEBCONTAINER.WEBAPP.WEBAPP LOGERROR SRVE0293E: [SERVLET ERROR] – [COM.COMPANY.DEBUG.CIOSTOPREQUESTEXCEPTION] : COM.COMPANY.DEBUG.CIOSTOPREQUESTEXCEPTION

AT COM.COMPANY.DEBUG.PLUGINS.REQUEST.USERAUDITREQUESTPLUGIN.PREINVOKE (USERAUDITREQUESTPLUGIN.JAVA:93)

AT COM.COMPANY.DEBUG.CIOREQUESTPLUGINMANAGER.PREINVOKE (CIOREQUESTPLUGINMANAGER.JAVA:128)

AT COM.COMPANY.DEBUG.CIOWEBAPPINVOCATIONCOLLABORATOR.PREINVOKE (CIOWEBAPPINVOKATIONCOLLABORATOR.JAVA:35)

AT COM.COMPANY.WS.WEBCONTAINER.COLLABORATOR.COLLABORATORHELPERIMPL. DOINVOCATIONCOLLABORATORSPREINVOKE (COLLABORATORHELPERIMPL.JAVA:125)

FIG. 7

DYNAMIC EXTENSIBLE APPLICATION SERVER MANAGEMENT

BACKGROUND

The present invention relates to enterprise management of security functions. More particularly, the present invention relates to dynamic extensible application server management.

Application servers, such as Java™ based JEE/J2EE® application servers, may be deployed within a network. The network may be utilized within an enterprise environment or other networking environment to provide accessible application-level services within the enterprise environment. Users of client computing devices within the respective network may access and utilize applications that are deployed to and hosted by the application servers within the network.

BRIEF SUMMARY

A method includes providing, by a processor, an administrative control interface that controls deployed application server plugins that operate within an application-server plugin framework deployed at a plurality of application servers, where the administrative control interface controls dynamic adjustment of runtime application server plugin configurations that perform request-level management and server-level management of the plurality of application servers; and controlling, using at least one of the deployed application server plugins as specified by application-server plugin commands received via the administrative control interface, request-level application server functionality and server-level application server functionality of at least one of the plurality of application servers.

A system includes a communication interface; and a processor programmed to: provide an administrative control interface that controls deployed application server plugins that operate within an application-server plugin framework deployed at a plurality of application servers, where the administrative control interface controls dynamic adjustment of runtime application server plugin configurations that perform request-level management and server-level management of the plurality of application servers; and control, via the communication interface, using at least one of the deployed application server plugins as specified by application-server plugin commands received via the administrative control interface, request-level application server functionality and server-level application server functionality of at least one of the plurality of application servers.

A computer program product includes a computer readable storage medium having computer readable program code embodied therewith, where the computer readable program code when executed on a computer causes the computer to: provide an administrative control interface that controls deployed application server plugins that operate within an application-server plugin framework deployed at a plurality of application servers, where the administrative control interface controls dynamic adjustment of runtime application server plugin configurations that perform request-level management and server-level management of the plurality of application servers; and control, using at least one of the deployed application server plugins as specified by application-server plugin commands received via the administrative control interface, request-level application server functionality and server-level application server functionality of at least one of the plurality of application servers.

BRIEF DESCRIPTION OF THE SEVERAL VIEWS OF THE DRAWINGS

FIG. 5 is a diagram of an example of an implementation of a log record created in response to issuing the command described above using the example first pseudo command syntax to the example UserAuditRequestPlugin according to an embodiment of the present subject matter;

FIG. 6 is a diagram of an example of an implementation of a log record created in response to issuing the command described above using the example second pseudo command syntax to the example IPAddressAuditRequestPlugin according to an embodiment of the present subject matter;

FIG. 7 is a diagram of an example of an implementation of a log record created in response to actions executed by the UserAuditRequestPlugin after the designated user is revoked in response to an attempted application server access according to an embodiment of the present subject matter;

DETAILED DESCRIPTION

Figure 1:
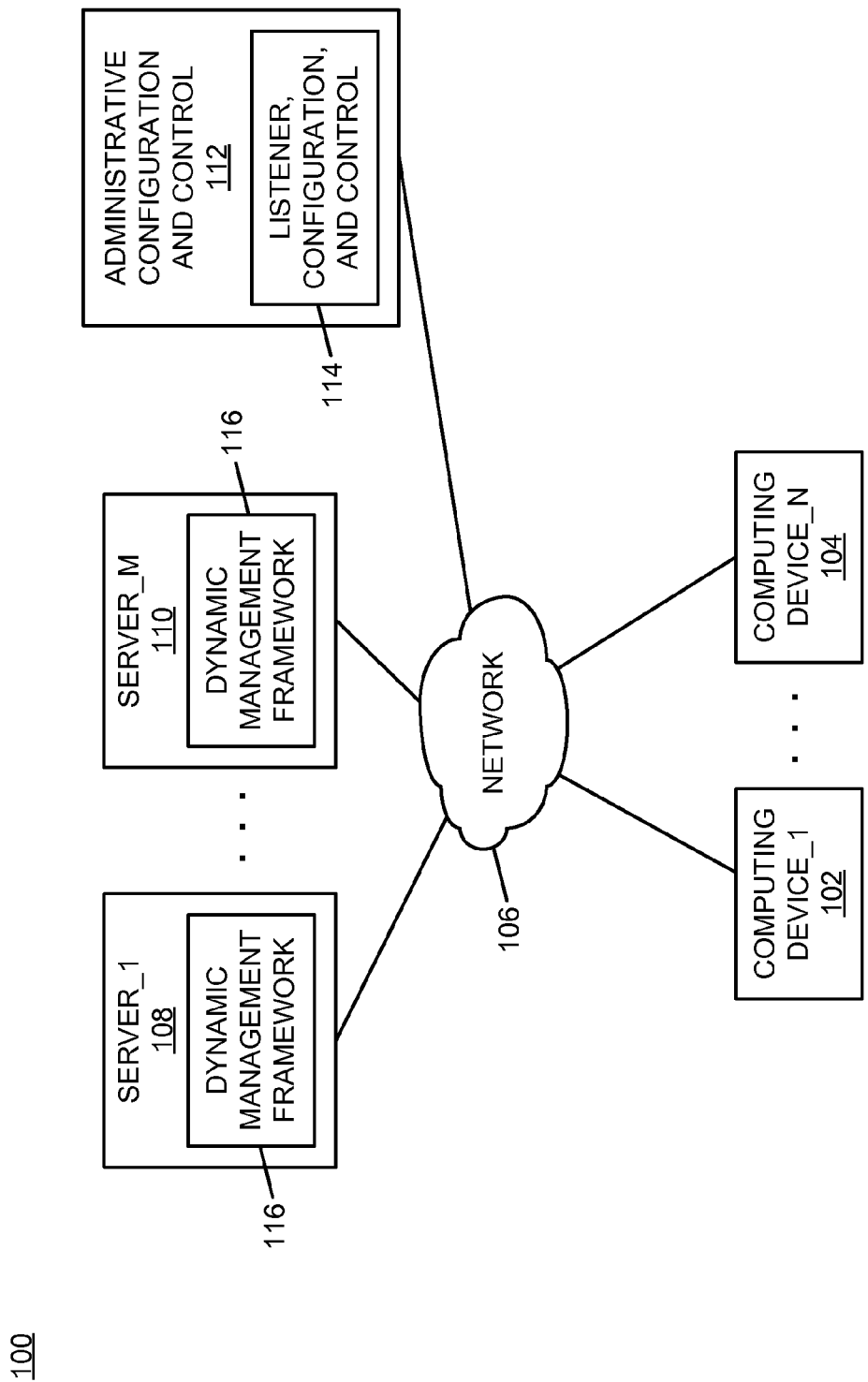
FIG. 1 is a block diagram of an example of an implementation of a system for dynamic extensible application server management according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic extensible application server management. The technology described herein provides an application-server plugin framework that supports run-time application-server plugin installation, operation, and control. The present technology provides application server management functionality that includes an ability to create, deploy, operate, and control custom application-server plugins. The custom application-server plugins provide two primary categories of management operations within an application server environment. The first category of application server management operations provide server-level command and control operations. The second form of application server management operations provide request-level command and control operations.

The server-level command and control operations include, for example, querying a server security configuration of an application server, querying logged in users at an application server, checking for certificate expiration dates of certificates at an application server, and other server-level operations. The server-based processing operates at an application server level, and provides information discovery, operations that may return data in reply to a requestor, and other server-level functionality. The server-based processing supports application controls that may be deployed in real time to change either inputs or outputs of applications deployed on an application server.

The request-level command and control operations include, for example, auditing users or Internet protocol (IP) addresses, revoking access from users or IP addresses, gathering details of a request (e.g., parameters, headers, and response information), analyzing parameters for cross-site scripting attacks, analyzing a request for anomalies, and other request-level operations. The request-based processing operates at an individual request level, and individual requests and responses may be analyzed and modified. The request-based processing supports pre-filtering and post-filtering of information associated with requests to (and responses from) applications hosted by application servers, including session monitoring, request or response modification, intrusion detection, and other request-level functionality.

As such, the subject matter described herein leverages run-time deployment of plugin technology to provide dynamic and extensible information gathering and message content control within an application server environment. The information gathering and message content control capabilities are provided by an application-server plugin framework. The application-server plugin framework provides server and application level controls within an application server, and also provides control of any sessions instantiated with an application server.

The information gathering and message content control capabilities provided by the application-server plugin framework may be granularly implemented without modification of deployed applications. While other forms of partitioning information gathering and message content control may be implemented, the examples described herein operate by partitioning information gathering and message content control into two general categories of processing. The two general categories of processing described herein are server-based processing and request-based processing.

As such, the application-server plugin framework described herein provides real-time, context-aware, inspection of requests and responses (e.g., determine what is happening within an application server for a particular session before and after application requests). The application-server plugin framework further provides technology to implement specific actions based on the analysis of a particular request/response (e.g., block a request), server control functions, and an ability to provide context-aware input to enterprise security intelligence functions (e.g., QRadar®).

If a real-time threat occurs within an enterprise environment (e.g., an intrusion), and specific information is needed to act on the threat, an administrator may write an application-server plugin that implements either application-level or request-level information gathering and controls. The application-server plugin may be deployed within the application-server plugin framework to all application servers in the enterprise environment from a central administrative system.

The plugin technology of the application-server plugin framework operates using a "listener" module (e.g., MBean interfaces) that provides control capability for application-server plugins that operate as plugin "control filters" that are installed on application server nodes. These plugins may perform a wide variety of functions, and are further described below.

In particular, a variety of scenarios may be considered in which there are security threats to one or more applications running on an application server. Network-centric mechanisms, such as intrusion prevention systems (IPSs) and firewall technology, operate at boundaries of network systems. As such, these forms of network-centric mechanisms do not have access to application context information and session context information at an application layer within application servers. Because the application-server plugins have access to application context information and session context information that is not available to mechanisms operating outside the application server (e.g., an IPS or firewall), the plugins may utilize that context in ways not possible by other components, and/or even provide such context to external components (in the example below, QRadar®) for analysis and correlation with other monitoring data. The application-server plugins may also block access to an application or generate alerts based upon this contextual information that may not be available to network-centric components.

Example application server environments within which the present technology may be implemented are, for example, a JEE/J2EE® application server (e.g., WebSphere® Application Server (WAS)), a PHP: Hypertext Preprocessor (PHP) based application server frameworks, and other application server frameworks as appropriate for the respective implementation. It is understood that the present technology may be implemented within any application server environment to integrate the functions described herein.

As described above, and in more detail below, the present technology provides direct access to server-level application context (e.g., visibility into application/user context) and request-level context (e.g., visibility into sessions, etc.) that is not available with previous technologies, such as the network-centric mechanisms described above. The present technology directly leverages application, session, and user context information to provide a new form of detection, prevention, and/or remediation capabilities. The present technology also provides an extensible plugin framework that operates outside of an application. As such, the applications deployed on an application server do not have to be modified to utilize the extensible plugin framework.

The present technology may be implemented in any environment/system where context/information that is available within an application server may be used to provide enhanced features from an external component that is external to an application server. For example, the present technology may plug in to the application server itself, as well as user context that is available within the application server, and perform operations that otherwise would not be possible from an external device without this application-server context information. To further the present example, it should be noted that requests are separated in time from responses.

Using the plugin technology described herein and the context that is thereby available from within an application server, requests and responses may be dynamically correlated from outside the application server environment to identify (e.g., audit) messaging associated with, for example, a single user or a single session. If an intrusion is detected, the present technology may be utilized to stop the user from accessing the application server, or to monitor what the user is doing by capturing individual requests and responses. As such, implementation of the present technology may be performed in a granular manner, as appropriate for a given implementation.

This access to context information that is within an application server environment provides increased insight and control opportunities for intrusion detection, prevention, and other aspects of application server control, as described above. Requests and correlated responses may be analyzed, and direct control of applications may be invoked, again without modification of the applications. Further, the plugins may be remotely deployed and controlled via the updatable "listener." The extensible plugin framework may be integrated with existing management frameworks (e.g., Tivoli®, etc.).

It should be noted that several configurations and platforms are possible for implementation of an application server. For example, an application server may be implemented as a single node or as a multiple node system. There may also be several application servers, such as multiple instances of a Java™ virtual machine (JVM) or non-Java application servers, running within a context of a single application server. Further, a "node" as the term is used herein represents a management context in a Websphere® application server (WAS), but the term node may also be applied within other contexts depending upon the architecture of the respective environment, and other terminology may be used as appropriate for a given implementation without departure from the scope of the present description.

Several "use cases" that illustrate possible implementations of the present technology are described below. However, it should be noted that these example use cases are provided for purposes of illustration, and do not limit application of the present technology to other use cases.

Regarding possible security use cases, user session status querying, user session and Internet protocol (IP) monitoring, and user/IP access blocking and revocation, represent example possible uses of the present technology. Further, other possible uses include cross-site scripting detection, compliance auditing and enforcement, and analytics and anomaly detection. Additionally, encryption key and certificate management, exposure analysis, and performance analysis also represent possible use cases. As such, many possibilities exist for implementation and use of the present technology, and all such possibilities are considered within the scope of the present technology.

Because of the dynamic and extensible nature of the present technology, if a determination is made that a deployed plugin should be changed, the plugin may be updated/changed and re-deployed. The application server infrastructure (e.g., hooks) is already in place within the extensible plugin framework. As such, real-time updating and augmentation of deployed functionality is possible in association with the present technology.

It should be noted that while the description herein generally describes examples based upon security implementations and application server-based intrusion control, the present technology may also be applied to non-security implementations. For example, performance measurement, auditing, and reconfiguration of an application server may also be performed using the present technology. The present technology may be applied to monitor and/or control applications other than application servers by use of the extensible plugin framework technology described herein. As such, the present technology may be applied to any application environment, as appropriate for a given implementation.

It should be noted that conception of the present subject matter resulted from recognition of certain limitations associated with application server management (e.g., security) analytics. For example, it was observed that a challenge within the field of application server management and security analytics is capturing the right information about the right applications (e.g., security and other important applications) at the right time (e.g., in real-time) to fully understand when a security or network compromise/intrusion is taking place, by whom, and what specifically the intruder is doing within the network environment. It was additionally observed that existing firewall and intrusion prevention system (IPS) capabilities lack sufficient information about who is accessing a network/application server or what is being accessed within the network/application server because this form of information is often encrypted during transmission, or there is insufficient context associated with an access to provide a complete picture of what is actually occurring during a network/application server access. It was determined from these observations that network information is insufficient to perform real-time security analytics regarding events and actions within an application server. It was further determined that more information about what is occurring with respect to individual applications that are being accessed and by whom is needed to provide a comprehensive security intelligence view of a network. It was further determined that a solution to providing a comprehensive security intelligence view of a network should supplement, rather than replace, existing network-centric security technologies, and should support a wide range of possible control capabilities along with providing a source of context-relevant input data for use in downstream real-time or offline analysis activities. It was further determined that an example of where valuable user and application context may be identified and derived is an application server within an enterprise or other network environment, such as a J2EE® application server (e.g., a WebSphere® Application Server (WAS)). It was additionally determined that a server-based and request-based framework within an application server that leverages plugin technology provides an opportunity for technological advancement that would not be possible externally using IPS technology. The present subject matter improves application server operational control by providing for increased visibility of contextual information from within an application server environment, as described above and in more detail below. As such, improved application server management may be obtained through use of the present technology.

The dynamic extensible application server management described herein may be performed in real time to allow prompt deployment and implementation of the application server management functionality described herein. For purposes of the present description, real time shall include any time frame of sufficiently short duration as to provide reasonable response time for information processing acceptable to a user of the subject matter described. Additionally, the term "real time" shall include what is commonly termed "near real time" -generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for dynamic extensible application server management. A computing device_1 102 through a computing device_N 104 communicate via a network 106 with several other devices. The other devices include a server_1 108 through a server_M 110. An administrative configuration and control server 112 is also illustrated.

For purposes of the description herein, users of the computing device_1 102 through the computing device_N 104 utilize application servers deployed to the server_1 108 through the server_M 110, such as in a client-server arrangement. It is additionally noted that certain of the users of the respective computing devices utilize the application servers as intended, and may be considered "legitimate users," such as persons performing accounts payable or accounts receivable activities for a business. It should additionally be noted, however, that the present technology addresses situations where other users of one or more of the computing device_1 102 through the computing device_N 104 is not attempting to utilize the application servers for legitimate purposes, and this user may be considered an "attacker" (e.g., hacker) of application servers within the system 100. As described above, conventional network-centric mechanisms, such as IPS and firewall technology, lack application context information and session context information at an application layer within application servers. The present technology addresses this technological area of application server threats using the dynamic extensible application server management described herein.

To implement the dynamic extensible application server management, the administrative configuration and control server 112 includes a listener, configuration, and control module 114 (hereinafter alternatively the "listener" module 114 for brevity). The listener module 114 provides configuration and control capabilities for deployment of application server plugins that operate on and interface with application servers that are deployed on and hosted by the server_1 108 through the server_M 110. The application server plugins may be installed by the listener module 114 into a dynamic management framework 116 at each of the server_1 108 through the server_M 110. As described above, the application-server plugins may be implemented with MBean interfaces, or may be implemented otherwise as appropriate for a given implementation.

The listener module 114 also provides real-time monitoring (listening) capabilities related to server-level and request-level activities of application servers deployed on the respective server_1 108 through the server_M 110. An administrator charged within management activities within a network or system, such as represented generally by the network 106 and the system 100, may utilize the listening capabilities of the listener module 114 to evaluate real-time server-level and request-level activities within the system 100.

As will be described in more detail below in association with FIG. 2 through FIG. 10B, the server_1 108 through the server_M 110 and the administrative configuration and control server 112 provide automated dynamic extensible application server management. The automated dynamic extensible application server management is based upon evaluation and control of real-time server-level and request-level activities of application servers within the system 100. It should be understood that the present technology may be implemented at a user computing device or server device level. A variety of possibilities exist for implementation of the present subject matter, and all such possibilities are considered within the scope of the present subject matter.

It should further be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
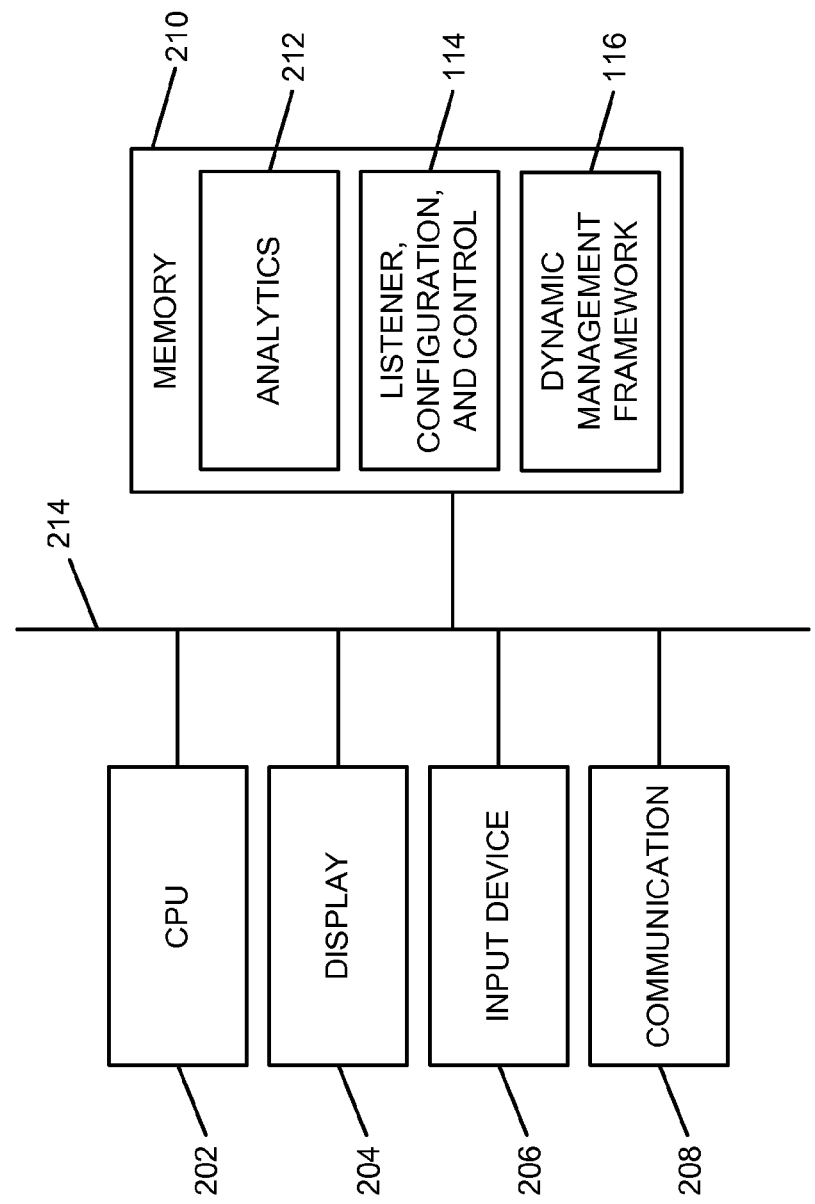
FIG. 2 is a block diagram of an example of an implementation of a core processing module capable of performing dynamic extensible application server management according to an embodiment of the present subject matter.

FIG. 2 is a block diagram of an example of an implementation of a core processing module 200 capable of performing dynamic extensible application server management. The core processing module 200 may be associated with either the computing device_1 102 through the computing device_N 104, with the server_1 108 through the server_M 110, and/or with the administrative configuration and control server 112 as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of server-level and request-level activities associated with application servers in association with each implementation. As such, for any of the examples below, it is understood that any aspect of functionality described with respect to any one device that is described in conjunction with another device (e.g., sends/ sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 provides a communication interface and may include any electrical, protocol, and protocol conversion capabilities useable to provide interconnection capabilities, appropriate for a given implementation.

A memory 210 includes an analytics storage area 212 that stores information associated with dynamic extensible application server management within the core processing module 200. For example, the analytics storage area 212 may capture and store real-time and non-real time information associated with server-level and request-level activities associated with application servers. The stored information may be distributed and stored at deployed application servers or may be collected and stored at the administrative configuration and control server 112 for evaluation, such as by an administrator.

The memory 210 also is shown to include the listener, configuration, and control module 114 (alternatively, the "listener" module 114 for brevity) and the dynamic management framework module 116. While the listener module 114 may be deployed to any device appropriate for a given implementation, this module may be considered deployed to the administrative configuration and control server 112 for purposes of the examples herein. Further, while the dynamic management framework module 116 may be deployed to any device appropriate for a given implementation, this module may be considered deployed to the server_1 108 through the server_M 110 for purposes of the examples herein.

The listener module 114 may be used to create, deploy, operate, and control custom application-server plugins, as described herein. The dynamic management framework module 116 may be used to install and operate custom application-server plugins at an application server device, as also described herein.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

It should also be noted that the listener module 114 and the dynamic management framework module 116 may include instructions executed by the CPU 202 for performing the functionality described herein. The CPU 202 may execute these instructions to provide the processing capabilities described above and in more detail below for the core processing module 200. The respective modules may form a portion of an interrupt service routine (ISR), a portion of an operating system, a portion of a browser application, or a portion of a separate application without departure from the scope of the present subject matter.

The CPU 202, the display 204, the input device 206, the communication module 208, and the memory 210 are interconnected via an interconnection 214. The interconnection 214 may include a system bus, a network, or any other interconnection capable of providing the respective components with suitable interconnection for the respective purpose.

Though the different modules illustrated within FIG. 2 are illustrated as component-level modules or in-memory modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
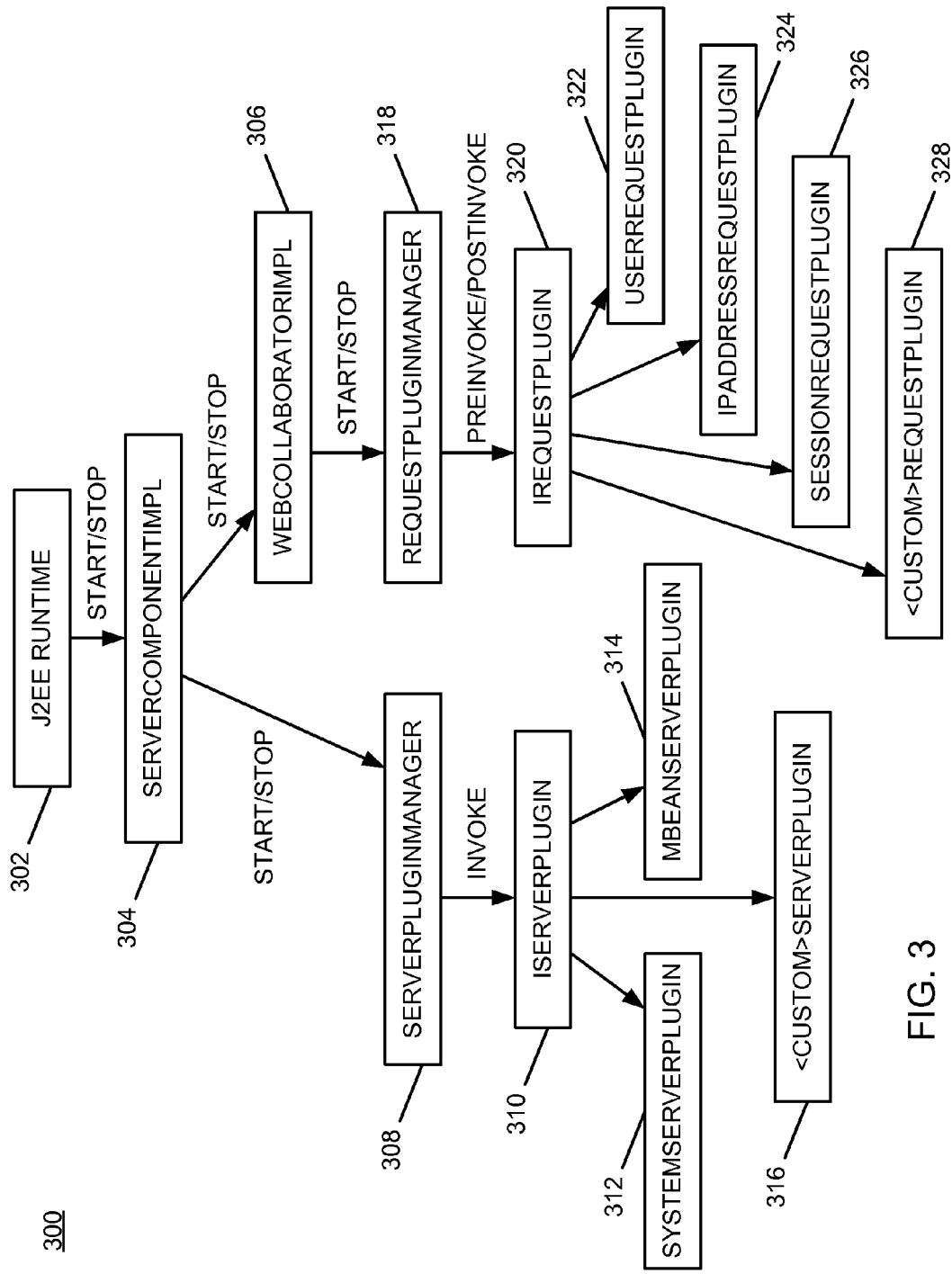
FIG. 3 is a diagram of an example of an implementation of a plugin framework class diagram usable to implement dynamic extensible application server management according to an embodiment of the present subject matter.

FIG. 3 is a diagram of an example of an implementation of a plugin framework class diagram 300 usable to implement dynamic extensible application server management. The present example illustrates how an application server plugin framework, such as the dynamic management framework module 116, interacts with a J2EE® runtime 302. However, as described above, it is understood that the present technology may be implemented within other application server environments to integrate the functions described herein. The plugin framework class diagram 300 may be stored within a memory, such as the memory 210, and the respective classes may be instantiated, such as within the dynamic management framework module 116, to implement the dynamic extensible application server management described herein. The respective memory components are understood to be incorporated into FIG. 3, and these memory components are omitted to avoid crowding within the drawing figure. The respective elements shown within FIG. 3 are further understood to also represent class definitions and the associated instantiated objects/components in their respective forms. As such, for the remainder of the description of FIG. 3, the elements below the J2EE® runtime 302 are termed "components" to capture both forms of the respective elements within an implementation of the present technology.

The plugin framework class diagram 300 implements two distinct server runtime interfaces/components that support dynamic extensible application server management: a ServerComponentImpl component 304, and a WebCollaboratorImpl component 306. The ServerComponentImpl component 304 allows components to start and stop within the application server during runtime. The WebCollaboratorImpl component 306 obtains control of session-level activities before and after every request comes into the system.

To perform the server-level functionality described herein, the ServerComponentImpl component 304 invokes a ServerPluginManager component 308. The ServerPluginManager component 308 and its sub-components may be dynamically started/stopped during runtime. The ServerPluginManager component 308 maintains individual plugins that are invoked (e.g., started and executed) during server operations using an "individual" server plugin component, termed an iServerPlugin component 310. The iServerPlugin component 310 further manages a SystemServerPlugin component 312, an MBeanServerPlugin component 314, and a CustomServerPlugin component 316. The SystemServerPlugin component 312 may manage configuration of the application server, including, for example, patch management, server restarts, and other configuration changes. The MBeanServerPlugin component 314 may manage dynamic loading, unloading, starting, and stopping of server Managed Beans (Mbeans).

The CustomServerPlugin component 316 manages dynamically installed application server plugins that operate to implement the server-level activities of deployed application servers. It should be noted that the CustomServerPlugin component 316 is illustrated with the bracketed word "<Custom>" in the drawing figures to indicate the runtime installation and configurability of the CustomServerPlugin component 316. The CustomServerPlugin component 316 (e.g., custom application-server plugin) may be implemented and deployed during runtime after the dynamic management framework module 116 has been deployed to and installed on an application server by a central administration server, such as the administrative configuration and control server 112.

Further regarding the WebCollaboratorImpl component 306, to perform the request-level functionality described herein, the WebCollaboratorImpl component 306 invokes a RequestPluginManager component 318. The RequestPluginManager component 318 and its sub-components may be dynamically started/stopped during runtime. The WebCollaboratorImpl component 306 starts and stops the RequestPluginManager component 318 as appropriate in relation to requests. The RequestPluginManager component 318 further invokes an "individual" request plugin component, termed an iRequestPlugin component 320. Pre-invoke and post-invoke operations may further be performed, such as insertion of data or modification of data of a response, respectively. The iRequestPlugin component 320 further invokes (e.g., starts/stops during runtime) a UserRequestPlugin component 322, an IPAddressRequestPlugin component 324, a SessionRequestPlugin component 326, and a CustomRequestPlugin component 328.

The UserRequestPlugin component 322 may implement individual user request monitoring and/or control during runtime within an application server. The IPAddressRequestPlugin component 324 may implement individual Internet Protocol (IP) address monitoring and/or control during runtime within an application server. The SessionRequestPlugin component 326 may implement individual session monitoring and/or control during runtime within an application server. The CustomRequestPlugin component 328 may be used to implement custom request-level processing activities. It should be noted that the CustomRequestPlugin component 328 is also illustrated with the bracketed word "<Custom>" in the drawing figures to indicate the runtime installation and configurability of the CustomRequestPlugin component 328. While the example implementation above is provided for purposes of example, it should be understood that many options for implementation of monitoring and/or control during runtime of an application server are possible, and all such options are considered within the scope of the present technology.

As described above, the dynamic management framework module 116 supplies a "listener" capability by which commands may be sent to one or more plugins to perform specific functions. As also described above, two types of plugins are defined: a server-level plugin, and a request-level plugin.

Further regarding the server-level plugin, such as one of the plugins managed by the ServerPluginManager 308 described above, this type of plugin acts at the application server level and supports functions which are not request/response specific. The server-level plugin provides discovery of other operations that may return data to a requestor. For example, the server-level plugin may provide application server session information (e.g., which users are logged in, etc.), configuration information (e.g., what applications/versions are deployed on the server, etc.), and validating keystores (e.g., examining keystores for soon to expire digital certificates, etc.).

Further regarding the request-level plugin, such as one of the plugins managed by the RequestPluginManager component 318 described above, this type of plugin operates on individual requests (e.g., at the individual request/response level) to manage requests to and/or responses from an application hosted at an application server. The request-level plugin supports pre-filtering and post-filtering. An individual request may be intercepted as it is received by the application server and before it is processed by the application, allowing "pre-invoke" actions to be performed (e.g., blocking the request, triggering audit actions, etc.). Similarly, an individual response from the application may be intercepted prior to it being sent back to the client and "post-invoke" actions may be executed to filter the response (e.g., modifying/transforming the response, redirecting the user to another location, generating error responses, etc.). As such, the request-level plugin supports session monitoring, request and response modification, intrusion detection, and other request-based types of operations.

It should be noted that implementation of a user interface to provide the respective server-level and request-level control capabilities to an administrator may be implemented within a graphical user interface (GUI), by command-line entry, or otherwise as appropriate for a given implementation. For purposes of the following description, certain options for command construction (whether GUI, command line, or otherwise) are described. Further, where a GUI implementation is implemented, a unified GUI that supports server-level plugin and request-level plugin creation, deployment, and control may be provided. It should be understood that many possibilities exist for construction of user interface commands and that all such possibilities are considered to be within the scope of the present subject matter.

The following example illustrates one possible scenario for revoking user access using a request-level plugin, such as the UserRequestPlugin component 322 described above. A plugin may be named, for example, "UserAuditRequestPlugin." A command to invoke processing to revoke user access may be provided to the UserAuditRequestPlugin. The command may be formatted, for example, as illustrated by the following first pseudo command syntax, where the plugin name is the first element of the user input, followed by the term "command" and the specific details of the revocation requested.

UserAuditRequestPlugin command revoke: joeuser@nomail.relay.company.com

As can be seen from this first pseudo command syntax, an individual user identifier "joeuser" with an email from address site of "nomail.relay.company.com" has been designated to be blocked. The command, when issued to the UserAuditRequestPlugin, may block accesses by this user to the respective application server to which the command is issued. A similar user interface confirmation may be provided to the administrator to confirm initiation of revocation of access for the designated individual user. Further, logging may be implemented to document specific access attempts that are blocked by the UserAuditRequestPlugin.

Figure 4:
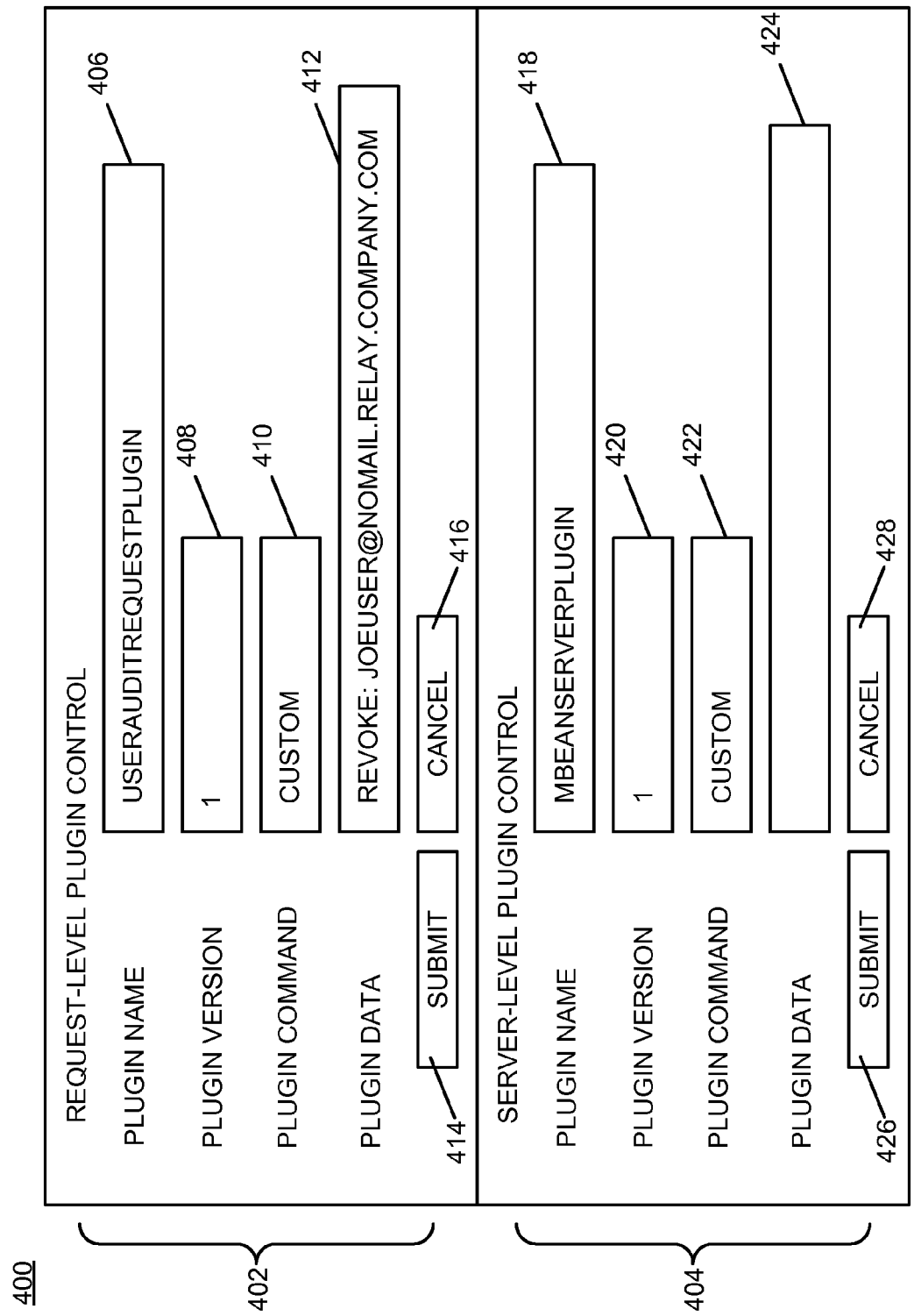
FIG. 4 is a diagram of an example of an implementation of a graphical user interface (GUI) implementation of an administrative control interface usable to implement dynamic extensible application server management according to an embodiment of the present subject matter.

FIG. 4 is a diagram of an example of an implementation of a graphical user interface (GUI) implementation of an administrative control interface 400 usable to implement dynamic extensible application server management. A request-level plugin control interface section 402 provides control functions to create, deploy, operate, and control custom request-level application-server plugins. A server-level plugin control interface section 404 provides control functions to create, deploy, operate, and control custom server-level application-server plugins. While certain partitioning of functionality among the respective plugins/control interfaces is described herein for purposes of example, it should be noted that multiple plugins may be used in combination to perform collaborative functionality. For example, multiple plugins may be used in combination to establish a closed-loop security monitoring life-cycle process that provides dynamic adjustment of identification, monitoring, alerting, analytics, auditing, and enforcement. Many forms of collaborative plugin processing are possible, and all such possibilities are considered within the scope of the present subject matter.

The request-level plugin control interface section 402 is shown to include a plugin name field 406 that allows selection or entry of a plugin name. A plugin version field 408 allows selection or entry of a plugin version number. A plugin command field 410 allows selection or entry of a command. A plugin data field 412 allows selection or entry of command metadata and command parameters. The fields 406, 408, 410, and 412 may each be implemented as a drop down list for selection of existing field options (e.g., plugin names of existing plugins, versions, previously-entered and configured commands, and previously-entered plugin data), and may be implemented as text entry fields for creation and deployment of new plugins. A submit button 414 and a cancel button 416 provide user selection of submission and cancellation of commands to remotely-deployed plugins.

As can be seen from FIG. 4, the plugin name field 406 is shown to include the request-level plugin name from the first pseudo command syntax described above (e.g., "UserAuditRequestPlugin"). The plugin version field 408 is shown to have version 1 of the respective plugin selected. The plugin command field 410 is shown to include the command name "CUSTOM" to select a custom request-level plugin command. The plugin data field 412 is shown to include the command associated with the first pseudo command syntax (e.g., revoke: joeuser@nomail.relay.company.com).

The server-level plugin control interface section 404 is shown to include a plugin name field 418 that allows selection or entry of a plugin name (e.g., "MBeanServerPlugin" in the present example). A plugin version field 420 allows selection or entry of a plugin version number (e.g., "1"). A plugin command field 422 allows selection or entry of a command (e.g., "custom"). A plugin data field 424 allows selection or entry of command metadata and command parameters (empty within FIG. 4 to designate that a previously-issued command to the MBeanServerPlugin has already been processed). The fields 418, 420, 422, and 424 may each be implemented as a drop down list for selection of existing field options (e.g., plugin names of existing plugins, versions, previously-entered and configured commands, and previously-entered plugin data), and may be implemented as text entry fields for creation and deployment of new plugins. A submit button 426 and a cancel button 428 provide user selection of submission and cancellation of commands to remotely-deployed plugins.

As such, the administrative control interface 400 controls application server plugins that operate within an application server plugin infrastructure, such as the dynamic management framework module 116, that is deployed at a plurality of application servers, such as the server_1 108 through the server_M 110. The administrative control interface 400 supports dynamic adjustment of deployed plugin configurations of plugins that perform request-level management and server-level management of the plurality of application servers. An administrative user of the administrative control interface 400 may create, deploy, operate, and control custom server-level and request-level application-server plugins to control operations at deployed plugins.

FIG. 5 is a diagram of an example of an implementation of a log record 500 created in response to issuing the command described above, using the example first pseudo command syntax, to the example UserAuditRequestPlugin. As can be seen from FIG. 5, a general "DATE TIME" timestamp may be provided for entries of the log record 500, and may be filled in as appropriate for the given implementation. It is understood that the log record 500 is illustrated to document processing associated with a single command, and that other log records may be captured within an operating environment.

A first log entry 502 shows an example of processing to receive the command described above by the first pseudo command syntax that includes a call (e.g., CALLING) to update (e.g., UPDATE) that includes plugin metadata (e.g., PLUGINMETADATA), and the name of the application server plugin to be updated (e.g., UserAuditRequestPlugin). A version number is also provided to facilitate and document versioning of plugins of identical names.

A second log entry 504 shows an example of internal processing to update (UPDATING) the designated plugin. As can be seen from the second log entry 504, the command issued by the administrator as represented by the first pseudo syntax described above is passed to the designated plugin.

A third log entry 506 shows an example of an acknowledgement from the UserAuditRequestPlugin that confirms it is revoking the designated user's access. As such, the log record 500 documents processing to pass request-level commands to the respective request-level plugin, and documents processing by the respective request-level plugin.

The following second example illustrates one possible scenario for revoking an IP address using a request-level plugin, such as the IPAddressRequestPlugin component 324 described above. A plugin may be named, for example, "IPAddressAuditRequestPlugin." A command to invoke processing to revoke an IP address may be provided to the IPAddressAuditRequestPlugin. The command may be formatted, for example, as illustrated by the following second pseudo command syntax, where the plugin name is the first element of the user input, followed by the term "command" and the specific details of the revocation requested.

IPAddressAuditRequestPlugin command revoke: 172.A.B.C

As can be seen from this second pseudo command syntax, an individual IP address identifier "172.A.B.C" has been designated to be blocked, where the letters "A," "B," and "C" represent integers for purposes of the present example that would form a valid IP address usable by an application server runtime to block the respective IP address. It should be understood that any IP address may be specified, as appropriate for a given implementation. The command, when issued to the IPAddressAuditRequestPlugin, may block accesses by this IP address to the respective application server to which the command is issued. A similar user interface confirmation may be provided to the administrator to confirm initiation of revocation for the designated individual IP address. Further, logging may be implemented to document specific access attempts that are blocked by the IPAddressAuditRequestPlugin.

FIG. 6 is a diagram of an example of an implementation of a log record 600 created in response to issuing the command described above using the example second pseudo command syntax to the example IPAddressAuditRequestPlugin. Elements similar to the elements illustrated and described in association with FIG. 5 are also illustrated within FIG. 6, and reference is made to the description of FIG. 5 for additional detail.

A first log entry 602 shows an example of processing to receive the command described above by the second pseudo command syntax that includes a call (e.g., CALLING) to update (e.g., UPDATE) that includes plugin metadata (e.g., PLUGINMETADATA), and the name of the application server plugin to be updated (e.g., IPAddressAuditRequestPlugin). A version number is also provided to facilitate and document versioning of plugins of identical names.

A second log entry 604 shows an example of internal processing to update (UPDATING) the designated plugin. As can be seen from the second log entry 604, the command issued by the administrator as represented by the second pseudo syntax described above is passed to the designated plugin.

A third log entry 606 shows an example of an acknowledgement from the IPAddressAuditRequestPlugin that confirms it is revoking the designated IP address. As such, the log record 600 documents processing to pass request-level commands to the respective request-level plugin, and documents processing by the respective request-level plugin.

Based upon the above-described command examples, the respective plugins may monitor user and IP address accesses, respectively, to the respective application server in real time, and may block/revoke any respective accesses from the designated user or IP address.

FIG. 7 is a diagram of an example of an implementation of a log record 700 created in response to actions executed by the UserAuditRequestPlugin after the designated user access is revoked in response to an attempted application server access. A first log entry 702 shows an example of pre-invocation (e.g., PREINVOKE) processing by the UserAuditRequestPlugin. A second log entry 704 shows an example of a user revoke alert generated by the UserAuditRequestPlugin, along with an example of detailed information (e.g., certificate information) that may be documented with respect to the revoked user. A third log entry 706 shows one example of several details that may be documented in association with the creation of an error/exception by the UserAuditRequestPlugin. The third log entry 706 is self-explanatory, and additional detail is omitted herein for brevity.

It should be noted that similar processing may be performed in response to identification of an access by the IP address described above and processed for revocation. Further, additional examples of server-level processing may be implemented similarly to the examples described above for the request-level processing. As described above, many possibilities exist for implementation of the present technology, and all such possibilities are considered within the scope of the present subject matter.

FIG. 8 through FIG. 10B described below represent example processes that may be executed by devices, such as the core processing module 200, to perform the dynamic extensible application server management associated with the present subject matter. Many other variations on the example processes are possible and all are considered within the scope of the present subject matter. The example processes may be performed by modules, such as the listener module 114 and the dynamic management framework module 116, and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 8:
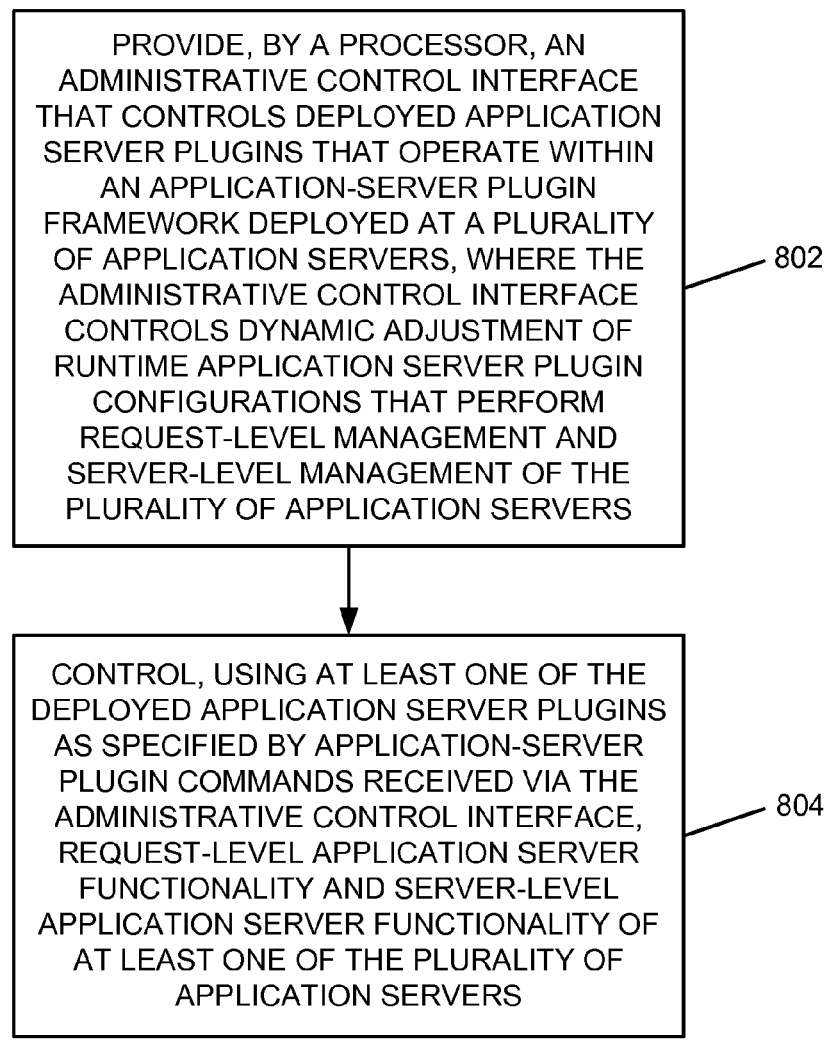
FIG. 8 is a flow chart of an example of an implementation of a process for dynamic extensible application server management according to an embodiment of the present subject matter.

FIG. 8 is a flow chart of an example of an implementation of a process 800 for dynamic extensible application server management. At block 802, the process 800 provides, by a processor, an administrative control interface that controls deployed application server plugins that operate within an application-server plugin framework deployed at a plurality of application servers, where the administrative control interface controls dynamic adjustment of runtime application server plugin configurations that perform request-level management and server-level management of the plurality of application servers. At block 804, the process 800 controls, using at least one of the deployed application server plugins as specified by application-server plugin commands received via the administrative control interface, request-level application server functionality and server-level application server functionality of at least one of the plurality of application servers.

Figure 9:
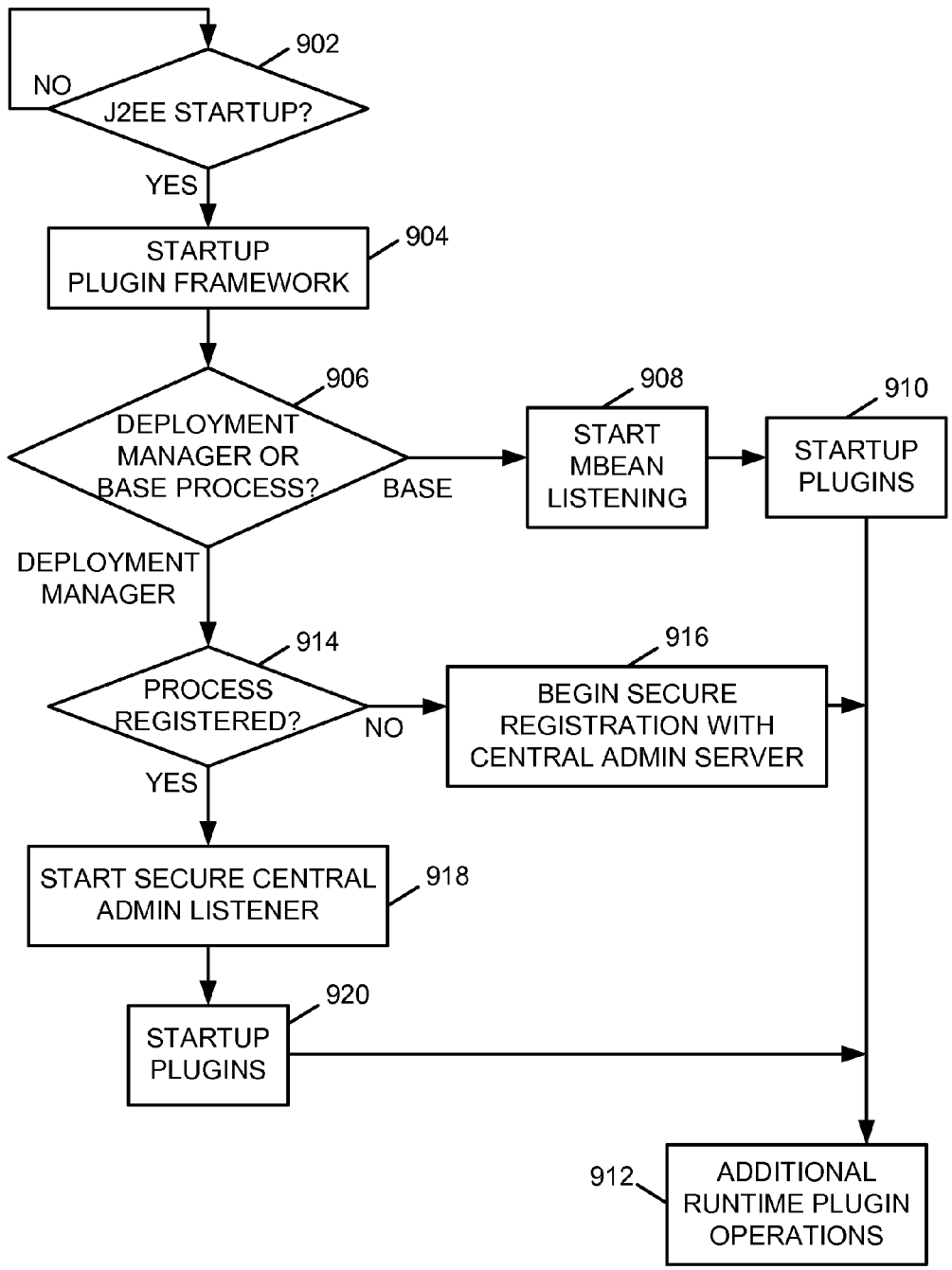
FIG. 9 is a flow chart of an example of an implementation of a process for starting up and initializing an application server plugin framework to support dynamic extensible application server management according to an embodiment of the present subject matter.

FIG. 9 is a flow chart of an example of an implementation of a process 900 for starting up and initializing an application server plugin framework to support dynamic extensible application server management. A different kind of listener component may be started to handle the secure registration process depending upon whether the process 900 is executed within a deployment manager or base server process. This processing involves a protocol that performs a key exchange that is secure to prevent unauthorized access to invocation of application server plugin commands. Other processes, such as application servers in a node (server device) may receive plugin commands directly from the deployment manager for that particular collection of servers only (e.g., the deployment manager for that particular cell in a WAS implementation). Additional processing may be performed to address implementation-specific details, as appropriate for the given implementation.

At decision point 902, the process 900 makes a determination as to whether a J2EE® runtime, such as the J2EE® runtime 302, startup has been detected. In response to determining that a J2EE® runtime startup has been detected, the process 900 operates to startup the plugin framework at block 904. At decision point 906, the process 900 makes a determination as to whether the listener component is being started within a deployment manager or base server process. In response to determining that the listener component is being started within a base server process, the process 900 starts MBean listening at block 908. At block 910, the process 900 operates to startup any plugins intended to operate within the plugin framework. The process 900 transitions to block 912 and performs additional runtime plugin operations, such as those described above, to create, deploy, operate, and control custom application-server plugins during the current J2EE® runtime.

Returning to the description of decision point 906, in response to determining that the listener component is being started within a deployment manager, the process 900 makes a determination at decision point 914 as to whether the deployment manager process is already registered with a central administrative server. In response to determining at decision point 914 that the deployment manager process is not already registered with a central administrative server, the process 900 begins secure registration with the central administrative server at block 916. In response to completion of registration processing, the process 900 transitions to block 912 and performs additional runtime plugin operations, such as those described above, to create, deploy, operate, and control custom application-server plugins during the current J2EE® runtime.

Returning to the description of decision point 914, in response to determining that the deployment manager process is already registered with a central administrative server, the process 900 operates to start a secure central administrative listener at block 918. At block 920, the process 900 operates to startup any plugins intended to operate within the plugin framework. The process 900 transitions to block 912 and performs additional runtime plugin operations, such as those described above, to create, deploy, operate, and control custom application-server plugins during the current J2EE® runtime.

Figure 10A:
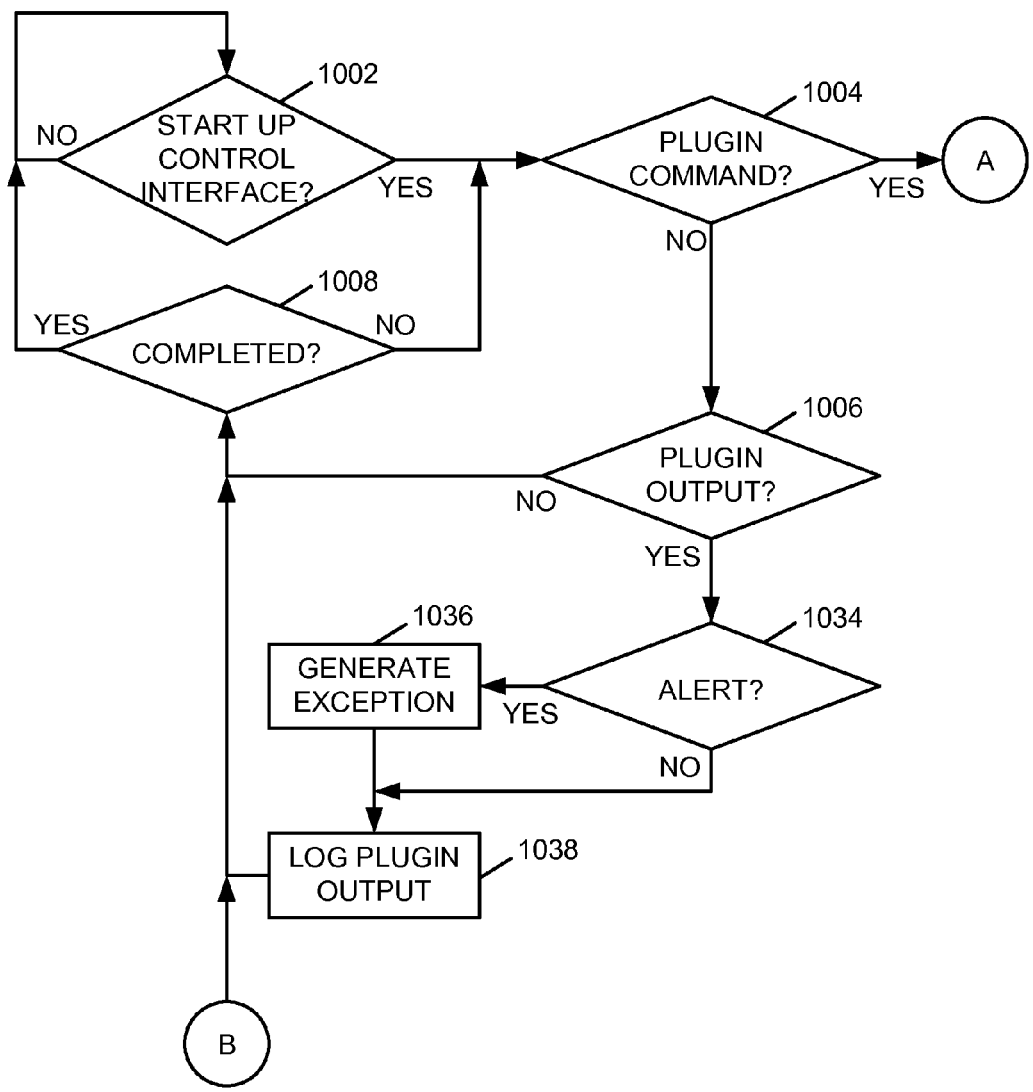
FIG. 10A is a flow chart of an example of an implementation of initial processing within a process for creation, deployment, operation, and control of custom application-server plugins to support dynamic extensible application server management according to an embodiment of the present subject matter.
Figure 10B:
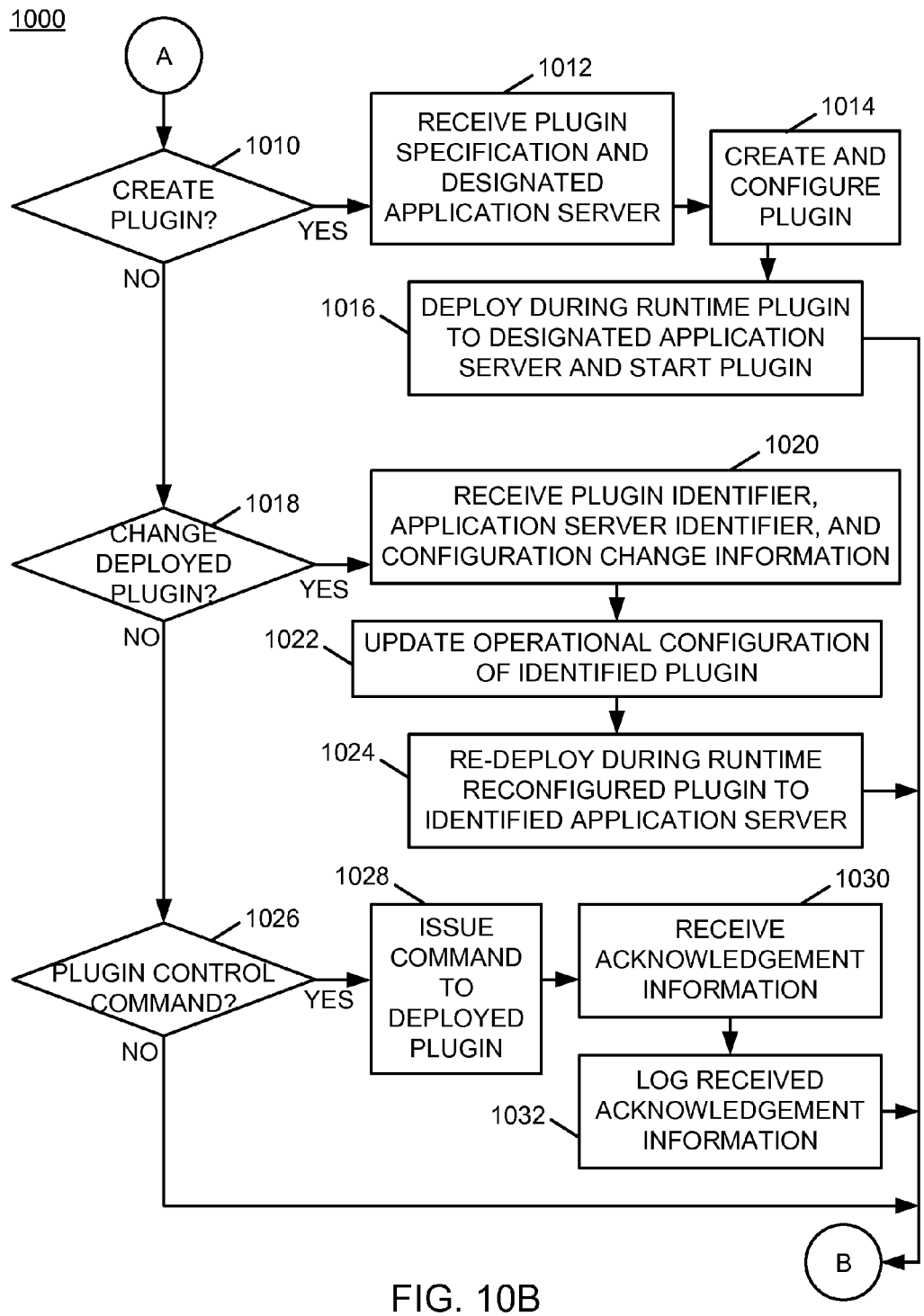
FIG. 10B is a flow chart of an example of an implementation of additional processing within a process for creation, deployment, operation, and control of custom application-server plugins to support dynamic extensible application server management according to an embodiment of the present subject matter.

FIGS. 10A and 10B are flow charts of an example of an implementation of a process 1000 for creation, deployment, operation, and control of custom application-server plugins to support dynamic extensible application server management. FIG. 10A illustrates initial processing within the process 1000. The process 1000 may be used to implement a "listener" component at an administrative server, along with processing for creation, deployment, operation, and control of application-server plugins.

At decision point 1002, the process 1000 makes a determination as to whether a command to start up an administrative control interface, such as the administrative control interface 400, has been detected. A command to start up an administrative control interface may include an indication from a user to open an administrative application, an indication from a user to open a GUI dialog box that provides interface controls for the administrative control interface, or other form of startup indication as appropriate for a given implementation.

In response to determining that a command to start up an administrative control interface has been detected, the process 1000 begins iterative higher-level processing and determines at decision point 1004 as to whether a plugin command has been received from a user, such as an administrator, via the administrative control interface. To continue with the description of the higher-level iterative processing, an affirmative determination at decision point 1004 is deferred and described in more detail further below.

As such, in response to determining at decision point 1004 that a plugin command has not been received from a user, such as an administrator, via the administrative control interface, the process 1000 makes a determination at decision point 1006 as to whether plugin output has been received from a deployed application server plugin. Again, processing responsive to an affirmative determination at decision point 1006 is deferred and described in more detail further below.

In response to determining at decision 1006 that plugin output has not been received from a deployed application server plugin, the process 1000 makes a determination at decision point 1008 as to whether processing via the administrative control interface is completed. Affirmative processing responsive to the determination at decision point 1008 is also deferred and described in more detail further below.

In response to determining at decision point 1008 that processing via the administrative control interface is not completed, the process 1000 returns to decision point 1004 and iterates to perform the higher-level iterative processing and determinations described above.

Returning to the description of decision point 1004, as described above, an administrative user may perform a variety of operations, including creating, deploying, operating, and controlling of custom request-level and server-level application-server plugins within an application-server plugin framework deployed at a plurality of application servers. The administrative control interface further controls dynamic adjustment of runtime/deployed application server plugin configurations that perform request-level management and server-level management of the plurality of application servers. As such, in response to determining at decision point 1004 that a plugin command has been received from a user, such as an administrator, via the administrative control interface, the process 1000 transitions to the processing shown and described in association with FIG. 10B.

FIG. 10B illustrates additional processing associated with the process 1000 for creation, deployment, operation, and control of custom application-server plugins to support dynamic extensible application server management. At block 1010, the process 1000 makes a determination as to whether a plugin command to create an application server plugin has been received. Processing associated with a negative determination at decision point 1010 is deferred and will be described in more detail below.

In response to determining that a plugin command to create an application server plugin has been received, the process 1000 receives, at block 1012, an application server plugin specification (e.g., initial configuration) and at least one designated application server to which to deploy the created application server plugin from the administrative user via the administrative control interface.

At block 1014, the process 1000 creates and configures the application server plugin. As described above, configuration for an application server plugin, whether for initial deployment (e.g., when the application-server plugin is created and deployed) or subsequent runtime control changes, may include configuring the application server plugin to perform request-level application server functionality and/or to perform server-level application server functionality.

The configured request-level application server functionality of the application server plugin may include configuring the application server plugin to audit user accesses to application servers, audit Internet protocol (IP) address accesses to application servers, revoke access to application servers from individual users, revoke access to the application servers from individual IP addresses, gather details of a request comprising parameters, headers, and response information, identify cross-site scripting attacks by analysis of parameters of requests, and identify anomalies associated with a request. It should be noted that this listing is an example of possible request-level configurations for an application server plugin, and that other possible request-level configurations for an application server plugin exist. As such, any possible request-level configuration for an application server plugin is considered within the scope of the present description.

The configured server-level application server functionality of the application server plugin may include configuring the application server plugin to query a server security configuration of the application servers, query an application status and/or configuration information of the application servers, query logged in users of the application servers, and check for certificate expiration dates of certificates at the application servers. It should be noted that this listing is an example of possible server-level configurations for an application server plugin, and that other possible server-level configurations for an application server plugin exist. As such, any possible server-level configuration for an application server plugin is considered within the scope of the present description.

Returning to the description of block 1014, in response to creating and configuring the application server plugin as request, the process 1000 deploys the created and configured application server plugin to the designated application server (s) within the application-server plugin framework and starts the respective plugins at block 1016. It should be noted that the deployment of the application server plugin is performed using the administrative control interface during runtime of the respective application server(s), and is performed to install the application server plugin into the application-server plugin framework deployed at the application servers. As such, the process 1000 deploys, during runtime using the administrative control interface, the application server plugin with an initial runtime application server plugin configuration to the respective application servers. The process 1000 returns to the processing described in association with FIG. 10A at decision point 1008, and iterates as described above.

Returning to the description of decision point 1010 within FIG. 10B, in response to determining that a plugin command to create an application server plugin has not been received, the process 1000 makes a determination at decision point 1018 as to whether a command to change a configuration of a deployed plugin has been detected. Processing associated with a negative determination at decision point 1018 is deferred and will be described in more detail below.

In response to determining that a command to change a configuration of a deployed plugin has been detected at decision point 1018, the process 1000 receives an application server plugin identifier (ID), an application server identifier (ID), and application server plugin operational configuration change information from the administrative user at block 1020.

At block 1022, the process 1000 updates the operational configuration of the identified plugin. The updated operational configuration may include changes to request-level or server-level monitoring and/or control of the application server to which the application server plugin is deployed. The processing at block 1022 may be considered re-configuring the operational functionality of the application server plugin. It should be noted that this processing may be considered changing, during runtime using the administrative control interface, the initial (or subsequent) deployed application server plugin operational configuration of the deployed application server plugins.

At block 1024, the process 1000 re-deploys during runtime the reconfigured application server plugin to the identified application server. The process 1000 returns to the processing described in association with FIG. 10A at decision point 1008, and iterates as described above.

Returning to the description of decision point 1018 within FIG. 10B, in response to determining that a command to change a configuration of a deployed plugin has not been detected, the process 1000 makes a determination at decision point 1026 as to whether an application server plugin control command has been received via the administrative control interface. As described above, application server plugin control commands may include commands to dynamically start operational functionality of the deployed application server plugins, dynamically stop the operational functionality of the deployed application server plugins, or to invoke request-level blocks (e.g., user blocks, IP address blocks, etc.), or server-level functions (e.g., auditing, etc.). As also described above, server-based processing supports application controls that may be deployed in real time to change either inputs or outputs of applications deployed on an application server. As such, changes may be made, during runtime without modification of an application server application, of inputs and/or outputs of an application server application associated with one or more users. For example, changes to inputs and/or outputs associated with an individual specified user or group of users that is/are accessing the application server application may be performed. Additionally, global changes of input and/or outputs for any user that is accessing the application server application may be performed. Many other forms of runtime plugin control commands and functionality are possible and all such runtime plugin control commands and functionality are considered within the scope of the present subject matter.

In response to determining that an application server plugin control command has been received via the administrative control interface at decision point 1026, the process 1000 issues the plugin control command to the deployed plugin at block 1028.

At block 1030, the process 1000 receives acknowledgement information from the deployed application server plugin. At block 1032, the process 1000 logs the received acknowledgement information. Example acknowledgement information and logging of the acknowledgement information is described further above.

In response to logging the received acknowledgement information at block 1032, or in response to determining at decision point 1026 that an application server plugin control command has not been received via the administrative control interface, the process 1000 returns to the processing described in association with FIG. 10A at decision point 1008, and iterates as described above. It should be noted that other application-server plugin commands may be implemented as appropriate for the given implementation, and any such commands are considered to be within the scope of the present subject matter.

Returning to the description of decision point 1006 in FIG. 10A, in response to determining at decision point 1006 that plugin output has been received from a deployed application server plugin, the process 1000 makes a determination at decision point 1034 as to whether the application server plugin output indicates that an alert has been generated by the deployed application server plugin. As described above, example deployed application server plugin alerts may include alerts generated in association with revocation of an application server access by a specified user or a specified IP address, or other alert as appropriate for the given implementation. In response to determining that an alert has been generated by the deployed application server plugin, the process 1000 generates an exception at block 1036, such as described above.

In response to generating the exception at block 1036, or in response to determining at decision point 1034 that an alert has not been generated by the deployed application server plugin, the process 1000 logs the plugin output at block 1038, and returns to decision point 1008.

Returning to the description of decision point 1008, in response to determining that processing via the administrative control interface is completed, the process 1000 returns to decision point 1002 and iterates as described above.

As such, the present subject matter allows application server plugins to be created using a common interface and to be controlled by a "listener" component at an administrative server. A given plugin may be enabled/disabled at any time and may implement any functionality that is supported in the specific application server environment. For example, a specific monitoring action may be dynamically enabled in response to a trigger event, such as suspicious activity detected by some other component, such as an IPS or firewall. As such, the present subject matter may be coupled to interoperate with IPS or firewall technology, and to implement functionality that the respective network-centric devices are not capable of performing. The present technology may be applied to many applicable/useful scenarios, such as security, performance, auditing, and other functions as appropriate for the given implementation. Application server plugins may be dynamically created, deployed, configured, controlled, and updated via the listener component. New plugins may be installed by a central administrative function via the listener component. As such, application server owners do not have to be directly involved in ongoing plugin/framework updates, and may instead allow these operations to be performed at an enterprise level, subject to the appropriate security mechanisms for authentication and authorization to perform administrative functions. Application server server-level and request-level plugins may be controlled via a Web interface, or other interface as appropriate for a given implementation. Further, the specific control attributes and command structures described herein are only examples and are not intended to limit what may be provided by any particular implementation.

As described above in association with FIG. 1 through FIG. 10B, the example systems and processes provide dynamic extensible application server management. Many other variations and additional activities associated with dynamic extensible application server management are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   providing, by a processor, a real-time plugin command-driven administrative control interface that controls, by issuing real-time application-server plugin commands to deployed application server plugins from within an application-server plugin framework deployed at a plurality of application servers, dynamic adjustment of runtime application server plugin operations that cause the respective deployed application server plugins to perform direct runtime request-level control operations and direct runtime server-level control operations that augment runtime application server operational functionality of the plurality of application servers with respect to accesses at an application layer within the respective application servers and accesses to individual applications executed by the respective application servers; and augmenting, by issuing a real-time application-server plugin command received via the real-time plugin command-driven administrative control interface to at least one of the deployed application server plugins, one of request-level application server operational functionality and server-level application server operational functionality of at least one of the plurality of application servers with respect to one of the accesses to the application layer within the respective application servers and the accesses to the individual applications executed by the respective application servers.

2. The method of claim 1, where the real-time application-server plugin command issued to the at least one of the deployed application server plugins causes the at least one of the deployed application server plugins to:
perform, as the server-level application server operational functionality augmentation, real-time monitoring of services selected from a group consisting of application server performance, application server security, and application server auditing of the at least one of the plurality of application servers.

3. The method of claim 1, where the real-time application-server plugin command issued to the at least one of the deployed application server plugins causes the at least one of the deployed application server plugins to:
perform, as the request-level application server operational functionality augmentation, a real-time change, during runtime without modification of an application server application, of at least one of a runtime input sent by a user to the application server application and a runtime output directed by the application server application to the user of the application server application associated with the user accessing the application server application.

4. The method of claim 1, further comprising:
deploying, during runtime to the at least one of the plurality of application servers via the processor using the real-time plugin command-driven administrative control interface, the at least one of the deployed application server plugins with an initial runtime application server plugin operational configuration that performs an initial augmentation of the one of the request-level application server operational functionality and the server-level application server operational functionality of the at least one of the plurality of application servers; and
where the real-time application-server plugin command issued to the at least one of the deployed application server plugins changes the initial runtime application server plugin operational configuration of the at least one of the deployed application server plugins by adjusting the initial augmentation of the one of the request-level application server operational functionality and the server-level application server operational functionality of the at least one of the plurality of application servers.

5. The method of claim 1, where the real-time application-server plugin command issued to the at least one of the deployed application server plugins causes the at least one of the deployed application server plugins to at least one of:
audit user accesses to the at least one of the plurality of application servers associated with an individual application executed by the one of the plurality of application servers;
audit Internet protocol (IP) address accesses to the at least one of the plurality of application servers associated with the user accesses to the individual application executed by the one of the plurality of application servers;
revoke access to the at least one of the plurality of application servers associated with the individual application executed by the one of the plurality of application servers from individual users;
revoke access to the at least one of the plurality of application servers associated with the individual application executed by the one of the plurality of application servers from individual IP addresses;
gather details of a request associated with the individual application executed by the one of the plurality of application servers comprising parameters, headers, and response information;
identify cross-site scripting attacks by analysis of parameters of requests associated with the individual application executed by the one of the plurality of application servers; and
identify anomalies associated with a request associated with the individual application executed by the one of the plurality of application servers.

6. The method of claim 1, where the real-time application-server plugin command issued to the at least one of the deployed application server plugins causes the at least one of the deployed application server plugins to at least one of:
query a server security configuration of the at least one of the plurality of application servers;
query at least one of application status and configuration information of an individual application executed by the at least one of the plurality of application servers;
query logged in users of the at least one of the plurality of application servers; and
check for certificate expiration dates of certificates at the at least one of the plurality of application servers.

7. The method of claim 1, where the real-time application-server plugin command issued to the at least one of the deployed application server plugins causes the at least one of the deployed application server plugins to:
dynamically start operational functionality of the at least one of the deployed application server plugins at the at least one of the plurality of application servers responsive to a plugin start command received via the real-time plugin command-driven administrative control interface; and
dynamically stop the operational functionality of the at least one of the deployed application server plugins at the at least one of the plurality of application servers responsive to a plugin stop command received via the real-time plugin command-driven administrative control interface.

\* \* \* \* \*